| United States Patent [19] | [11] | Patent Number: | 4,849,473 |
|---|---|---|---|
| Cigna et al. | [45] | Date of Patent: | Jul. 18, 1989 |

[54] STENGTHENED HIGH IMPACT STYRENE POLYMERS SHOWING IMPROVED PHYSICAL-MECHANICAL PROPERTIES

[75] Inventors: Giuseppe Cigna, Mantova; Gian C. Fasulo, San Silvestro Di Curtatone; Gianfranco Biglione, Mantova; Italo Borghi, Ferrara, all of Italy

[73] Assignee: Montedipe S.p.A., Milan, Italy

[21] Appl. No.: 48,888

[22] Filed: May 12, 1987

[30] Foreign Application Priority Data

May 14, 1986 [IT]  Italy ................................. 20433A/86
Dec. 30, 1986 [IT]  Italy ................................. 22886A/86

[51] Int. Cl.⁴ ...................... C08L 51/04; C08L 51/06; C08L 25/04; C08L 23/04
[52] U.S. Cl. ......................................... 525/86; 525/70; 525/71; 525/75; 525/80; 525/211; 525/238; 525/240; 524/487; 524/504; 521/139
[58] Field of Search ................. 525/240, 211, 238, 75, 525/86, 70

[56] References Cited

U.S. PATENT DOCUMENTS 4,503,187  3/1985  Gunesin et al. ...................... 525/240
4,690,976  9/1987  Hahnfeld ............................... 525/75
4,704,431  11/1987  Stuart et al. ........................... 525/75

FOREIGN PATENT DOCUMENTS 57-135845  8/1982  Japan .

OTHER PUBLICATIONS

Barensen et al.–Mechanical Prop. of PS/EP Blends–British Polymer Journal, vol. 10, pp. 17–22, 2/77.

Primary Examiner—Carman J. Seccuro
Attorney, Agent, or Firm—Stevens, Davis, Miller & Mosher

[57] ABSTRACT

Strengthened high impact resistant styrene polymers having improved physical-mechanical properties, particularly a high resilience at room temperature and at lower temperatures, and break elongation, containing as a dispersed phase an olefinic rubber, preferably an ethylene-propylene or an ethylene-propylene-diene rubber and a polyolefin. The amount of the polyolefin may be up to 15% by weight.

12 Claims, No Drawings

STENGTHENED HIGH IMPACT STYRENE POLYMERS SHOWING IMPROVED PHYSICAL-MECHANICAL PROPERTIES

Attention is also invited to the Biglione et al application, Ser. No. 48,889, filed approximately of even date herewith, and based on Italian application No. 20433 A/86, filed May 14, 1986.

FIELD OF THE INVENTION

The present invention relates to strengthened high impact sytrene polymers showing improved physical-mechanical features and in particular toughness and flexibility, impact strength at room temperature and at lower than room temperatures, and break elongation.

More particularly, the present invention relates to strengthened high impact styrene polymers showing high toughness and flexibility, high impact strength at room temperature and at temperatures lower than room temperatures, which polymers are particularly suitable for injection molding and thermoforming of compact or foamed articles to be used in the field of packaging, electrical household appliances, motor-car, telelectronics, and so on.

BACKGROUND OF THE INVENTION

As well known, high impact styrene polymers are obtained by bulk or bulk-suspension polymerization of solutions of polybutadiene or styrene-butadiene rubbers, or of saturated rubbers of the ethylene-propylene (EPM), ethylene-propylene-diene (EPDM) kind, in styrene alone or in admixtures of styrene with other polymerizable ethylenically unsaturated monomers. Generally, high impact styrene polymers, based on EPM or EPDM rubber, are obtained in the form of a masterbatch having a high rubber content, and are used either as such or in blends with stiff matrixes (such as for instance a styrene-acrylonitrile (SAN) copolymer or others) in order to obtain polymeric materials suitable for injection molding and thermoforming.

Such high impact polymers have excellent toughness properties at room temperature, particularly at high rubber concentrations, whereas the impact strength at low temperatures (for instance at $-30°$ C.) and the break elongation, in tensile stress tests, are not always satisfactory for all applications.

Such drawbacks may be avoided or limited to some extent by blending the high impact polymers with other polymers having the missing properties, in order to obtain a material having the desired combination of properties. Such approach, however, has been successful only in a few cases; in fact, the blending generally leads to the combination of the worst features of each component, thereby obtaining a material having such poor properties that it is of no commercial or practical value.

The main object of the present invention is to provide high impact styrene polymers containing an olefinic rubber, preferably an ethylene-propylene or an ethylene-propylene-diene rubber, having high values of toughness and flexibility and endowed with improved properties of impact strength at room temperature and at temperatures lower than room temperature, and of break elongation.

DISCLOSURE OF THE INVENTION

According to the present invention, high impact styrene polymers containing an olefinic rubber, in particular, an ethylene-propylene or an ethylene-propylene-diene rubber, and showing high values of toughness and flexibility and high features of impact strength, at room temperature and temperatures lower than room temperatures, and of break elongation, may be obtained by dispersing into said polymers a polyolefin.

Therefore the present invention resides in strengthened high impact styrene polymers consisting or consisting essentially of a styrene polymer and containing dispersed in the plastomeric phase an olefinic rubber, preferably an ethylene-propylene or ethylene-propylene-diene rubber, and, at least one polyolefin, the amount of the polyolefin being up to 15% by weight with respect to the polymer.

More particularly, the present invention relates to strengthened high impact styrene polymers consisting or consisting essentially of (a) a high impact styrene polymer containing an olefinic rubber and (b) a strengthening component consisting of a polyolefin. The amount of dispersed polyolefin may vary within a wide range, although amounts ranging between 15 and 0.01% are preferred.

According to a preferred embodiment of the present invention, the amount of polyolefin and of rubber should be such that the ratio by weight:

$$R_1 = \text{Polyolefin}/\text{Polyolefin} + \text{rubber}$$

shall be below 0.7 and, preferably, not over 0.5.

The sum of the content by weight of the polyolefin and of rubber is preferably not over 50% by weight with respect to the polymer; so that the ratio: $R_2 = \text{polyolefin} + \text{rubber}/\text{rubber} + \text{polyolefin} + \text{monomers}$ is not over 0.5 and preferably ranges between 0.1 and 0.3.

The polyolefin may be polyethylene, polypropylene, or an ethylene-propylene copolymer having a prevailing ethylene content, such as for instance a copolymer consisting of 75–98% by weight of ethylene and of 25–2% of propylene. Polyolefinic waxes may be used as well.

The term "polyethylene" includes any ethylene polymer having a density ranging from 0.90 to 0.97 g/cm$^3$, for instance low density polyethylene (LDPE), linear low density polyethylene (LLDPE), and high density polyethylene (HDPE).

The particles of the polyolefin dispersed in the polymeric system are fine, and have generally an average diameter ranging between 0.02 and 5 micrometers. Such particle sizes are particularly preferred in order to attain a higher density of the particles in the matrix unit and therefore a uniform degree of stengthening throughout the matrix.

The term "high impact styrene polymer containing an olefinic rubber" comprises any polymeric or copolymeric material consisting or consisting essentially of:

(a) a stiff matrix consisting of a styrene polymer, wherein there is dispersed
(b) an elastomeric phase consisting or consisting essentially of an olefinic rubber that may be grafted completely or partially onto the chains of the styrene polymer.

The term "styrene polymer" represents any thermoplastic solid polymer and copolymer consisting, completely or for the most part, (namely containing as chemically bound at least 50% by weight), of one or more styrene or vinyl aromatic compounds having the formula:

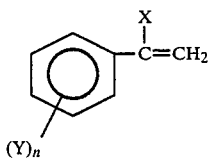

wherein X represents hydrogen or an alkyl radical having from 1 to 4 carbon atoms; Y representa a halogen atom or an alkyl radical having from 1 to 4 carbon atoms, and n is zero or a whole number from 1 to 5.

Examples of styrene or vinyl-aromatic compounds having the above-mentioned formula (I) are: styrene; methylstyrene; mono-, di-, tri-, tetra-, and penta-chlorostyrene and the corresponding alpha-methyl-styrenes; styrenes alkylated in the nucleus and the corresponding alpha-methyl-styrenes such as ortho- and para-methylstyrenes; ortho- and para-ethyl-styrenes; ortho- and para-methyl-alpha-methyl-styrenes, etc.

These monomers may be used either alone or mixed together or mixed with other copolymerizable ethylenically unsaturated co-monomers such as, for instance, maleic anhydride, acrylonitrile, methyl methacrylate, etc., in amounts up to 50% by weight.

The olefinic rubber may be either ethylene-propylene copolymers or ethylene-propylene-diene terpolymers, known respectively as EPM and EPDM.

The rubber content dispersed in the stiff matrix ranges preferably between 5 and 45% by weight.

The high impact styrene polymer that is particularly preferred in the present invention consists of:
(a) 70-90% by weight of a stiff matrix consisting of a copolymer containing 65-80% by weight of styrene and 35-20% by weight of acrylonitrile; and
(b) 30-10% by weight of an ethylene-propylene-diene rubber.

The high impact styrene polymer or copolymer containing an olefinic rubber may be used either alone or in admixture with up to 50% by weight of polystyrene or with a copolymer containing at least 50% of one or more compounds having the aforesaid formula (I), such as styrene-acrylonitrile (SAN) copolymer.

Said high impact styrene polymer or copolymer containing an olefinic rubber may be obtained by dissolving or by dispersing the rubber into the styrene monomer or into the mixture of monomers, optionally in the presence of a solvent, and by polymerizing the resulting dispersion in bulk-suspension or in continuous bulk as, for insance, as described in Italian Pat. No. 792,269.

The strengthened high impact styrene polymers of the present invention may be prepared by blending, in a conventional apparatus, the high impact styrene polymer or copolymer with either polyethylene, ethylene-propylene copolymers, or polypropylene. In particular, the preparation of the strengthened high impact styrene polymers of the present invention may be carried out by blending the starting polymeric products in the form of pellets in a mixer, and then the blend is processed in the plastic state at a temperature ranging between 150° and 250° C., preferably between 200° and 230° C., in a mono- or bi-screw extruder-granulator or in a Banbury mixer.

The thus-obtained strengthened high impact polymers show considerable improvement as regards impact strength at room temperature and at lower temperatures, and the break elongation. Therefore, said polymers prove to be particularly suitable for injection molding and thermoforming of shaped articles to be used in the field of packaging, electrical household appliances, motor-cars, telelectronics, and so on.

The strengthened high impact styrene polymers of the present invention may contain other compatible polymers, such as polycarbonate, polyesters, thermoplastic polyurethanes, polymethylacrylates, styrene-methyl methacrylate copolymers, acrylic polymers, ABS, styrene-maleic anhydride copolymers, SAN, vinyl chloride polymers, and other technopolymers. Such technopolymers or polymers may be added in any ratio, such as, for instance, between 10 and 90% by weight, with respect to the strengthened high impact styrene polymer of the present invention.

Moreover, said styrene polymers may be co-extruded together with the above-mentioned polymers and technopolymers to give rise to compositions having desirable characteristics for specific applications.

The strengthened high impact styrene polymers of the present invention may be additioned with different additives, such as, for instance, stabilizers, fire retardant agents, anti-static agents, and so on; agents for the production of particular UV resistant articles; self-extinguishing agents; agents scarcely attracting powders onto surfaces; or glass or carbon fibers or inorganic fillers, and so on. Moreover, expanding agents may be added to said polymers for the production of foamed articles. Suitable expanding agents include:
(a) chemical expanding agents such as, for instance, azodicarbonamide, which are added to the components and are permitted to decompose in the machine (press-injection or extruder) so as to obtain foamed articles or semifinished products having a density up to three times lower than that of the starting material; and
(b) physical expanding agents such as, for instance, aliphatic hydrocarbons having a short chain (propane, butane, pentane etc.) or halogenated hydrocarbons such as Freon. The pellets of the polymeric mixture are impregnated with such expanding agents and then foamed and sintered in order to obtain articles having a density up to 30 times lower than that of the starting material.

A few examples will be given hereinafter merely by way of illustration but not of limitation, in order still better to understand the present invention. In the examples, all parts and percentages are expressed by weight, unless otherwise specified.

EXAMPLES 1-16

A mixture consisting of a styrene-acrylonitrile-EPDM COPOLYMER (AES), (styrene/acrylonitrile=76/24), a styrene copolymer (SAN) containing 24% by weight of acrylonitrile and 76% by weight of styrene, and a low density linear polyethylene (LLDPE) (Escorene LL1201 ®) having a density of 0.926 and a melt flow index 0.7 g/10', measured at 190° C. and 2.16 kg, was fed into a rotary arm mixer at 100 revolutions per minute, according to the ratios of Table I.

The resulting mixture was extruded in a double screw WERNER PFLEIDERER ZSK53 extruder, operating at a temperature of 240° C.

The extruded "spaghetti", after cooling in water, was cut in the form of granules. The granules were fed into an injection press for the molding of the specimens.

The properties determined on the specimens were recorded in the following Table I, where are reported:
- total content of ethylene-propylene-diene rubber (EPDM) in the blend;
- total content of styrene+acrylonitrile (SAN) in the blend;
- ratio $R_1$ = polyolefin/rubber+polyolefin
- ratio $R_2$ = polyolefin+rubber/rubber+polyolefin+ monomers (SAN)
- IZOD impact strength, determined according to standard ASTM D256, at +23° C. and at −30° C.;
- tensile strength, determined according to standard ASTM D 638.

EXAMPLE 17

Following the operating conditions of Examples 1-16, a strengthened high impact styrene polymer was prepared consisting of:
- 50% by weight of AES;
- 40% by weight of SAN; and
- 10% by weight of high density polyethylene (HDPE) (ERACLENE HTG 6015®) having a density=0.96 and a melt flow index=3 g/10', measured at 190° C. and 2.16 Kg.

The contents of ethylene-propylene-diene rubber and styrene+acrylonitrile (SAN), $R_1$ and $R_2$ ratios, IZOD impact strength, and tensile strength are reported in Table I.

EXAMPLE 18

Example 17 was repeated but replacing polyethylene with polypropylene (PP)(MOPLEN S 30S ®) having a density=0.90 and a melt flow index=1.75 g/10', measured at 230° C. and 2.16 Kg.

The properties of the thus-obtained strengthened impact resistant polymer are reported in Table I.

What is claimed is:

1. A strengthened high impact styrene polymer blend having improved physical-mechanical features, and in particular high impact strength at room temperature and at lower temperatures and high break elongation, which polymer blend comprises a styrene polymer containing dispersed therein an olefine rubber in an amount of at least 5% by weight with respect to the styrene polymer, and a strengthening component consisting of a polyolefin in an amount ranging between 15 and 0.01% by weight with respect to the polymer blend.

2. A strengthened high impact styrene polymer blend according to claim 1.

3. A strengthened high impact styrene polymer blend according to claim 1 or 2, wherein the size of the dispersed particles ranges between 0.02 and 5 micrometers.

4. A strengthened high impact styrene polymer blend according to claim 1 or 2, wherein the polyolefin is selected from the class consisting of polyethylene, polypropylene, an ethylene-propylene copolymer containing from 75 to 98% by weight of ethylene and correspondingly from 25 to 2% by weight of propylene, and a polyolefine wax.

5. A strengthenbed high impact styrene polymer blend according to claim 4, wherein the polyolefin is polyethylene having a density ranging between 0.90 and 0.97 g/cm$^3$ and selected from the class consisting of low density polyethylene, linear low density polyethylene, and high density polyethylene.

6. A strengthened high impact styrene polymer blend according to claim 1, wherein the olefine rubber is selected from the class consisting of ethylene-polyene and ethylene-propylene-diene copolymers and mixtures thereof.

7. A strengthened high impact styrene polymer blend according to claim 2, wherein the ratio by weight: polyolefin/polyolefin+olefinic rubber is not over 0.5.

8. A strengthened high impact styrene polymer blend according to claim 1, wherein the ratio $R_2$=polyolefin-

TABLE I

| | EXAMPLES | | | | | | | | | | | | | | | | | |
|---|---|---|---|---|---|---|---|---|---|---|---|---|---|---|---|---|---|---|
| | 1* | 2 | 3 | 4 | 5* | 6 | 7 | 8 | 9* | 10 | 11 | 12 | 13 | 14 | 15 | 16 | 17 | 18 |
| AES % | 38.5 | 34.6 | 21.7 | 11.7 | 61.5 | 55.4 | 35.0 | 18.5 | 88.5 | 79.6 | 65 | 50 | 40 | 30.7 | 40 | 60 | 50 | 50 |
| SAN % | 61.5 | 64.4 | 74.0 | 81.3 | 38.5 | 43.0 | 58.1 | 70.3 | 11.5 | 18.1 | 29 | 40 | 47.4 | 54.3 | 50 | 30 | 40 | 40 |
| LLDPE % | — | 1.0 | 4.3 | 7.0 | — | 1.6 | 6.9 | 11.2 | — | 2.3 | 6 | 10 | 12.6 | 15 | 10 | 10 | — | — |
| HDPE % | — | — | — | — | — | — | — | — | — | — | — | — | — | — | — | — | 10 | — |
| PP % | — | — | — | — | — | — | — | — | — | — | — | — | — | — | — | — | — | 10 |
| EPDM % | 10 | 9 | 5.6 | 3 | 16 | 14.4 | 9.1 | 4.8 | 23 | 2.7 | 16.9 | 13 | 10.4 | 8.0 | 10 | 15 | 13 | 13 |
| TOTAL SAN | 90 | 90 | 90 | 90 | 84 | 84 | 84 | 84 | 77 | 77 | 77 | 77 | 77 | 77 | 80 | 75 | 77 | 77 |
| R1 | 0 | 0.10 | 0.43 | 0.70 | 0 | 0.10 | 0.43 | 0.70 | 0 | 0.10 | 0.25 | 0.43 | 0.55 | 0.65 | 0.51 | 0.40 | 0.43 | 0.43 |
| R2 | 0.10 | 0.10 | 0.10 | 0.10 | 0.16 | 0.16 | 0.16 | 0.16 | 0.23 | 0.23 | 0.23 | 0.23 | 0.23 | 0.23 | 0.20 | 0.25 | 0.23 | 0.23 |
| IZOD IMPACT STRENGTH | | | | | | | | | | | | | | | | | | |
| met. A (¼", +23° C.) J/m | 52 | 105 | 90 | 60 | 160 | 280 | 110 | 55 | 350 | 493 | 305 | 170 | 106 | 60 | 120 | 250 | 182 | 180 |
| met. A (⅛", −30° C.) J/m | 25 | 31 | 26 | 23 | 45 | 75 | 35 | 30 | 85 | 107 | 77 | 54 | 41 | 35 | 45 | 60 | 48 | 48 |
| met. E (¼", −30° C.) J/m | 190 | 344 | 460 | 260 | 700 | 980 | 980 | 380 | (1) | 1160 | 1340 | 1300 | 719 | 500 | — | — | 870 | 465 |
| TENSILE STRENGTH | | | | | | | | | | | | | | | | | | |
| Yield Point N/mm$^2$ | 47.0 | 47.0 | 45.5 | 46.0 | 41.0 | 41.0 | 41.5 | 42.0 | 31.0 | 31.5 | 33.0 | 31.0 | 30.5 | 31.5 | 34.0 | 28.0 | 32.0 | 35.00 |
| Break tensile strength N/mm$^2$ | 42.0 | 40.0 | 41.5 | 45.0 | 33.0 | 33.0 | 34.0 | 34.5 | 26.0 | 26.0 | 27.5 | 29.5 | 29.5 | 32.0 | 33.0 | 27.0 | 28.0 | 24.5 |
| Break elongation % | 10 | 9 | 35 | 25 | 11 | 18 | 50 | 28 | 14 | 29 | 59 | 58 | 54 | 30 | 61 | 76 | 52 | 7 |
| Modulus of N/mm$^2$ | 2550 | 2500 | 2600 | 2800 | 2200 | 2200 | 2250 | 2350 | 1700 | 1650 | 1700 | 1750 | 1700 | 1850 | 2000 | 1700 | 1700 | 1750 |

(1) I.D.N.B. = It does not break
*Comparison examples

+olefinic rubber/olefinic rubber+polyolefin+SAN, is not over 0.5.

9. A strengthened high impact styrene polymer blend according to claim 8, wherein the ratio $R_2$=polyolefin-+olefinic rubber/olefinic rubber+polyolefin+SAN, is between 0.1 and 0.3.

10. A strengthened high impact styrene polymer blend according to claim 1. or 2, wherein the high impact styrene polymer is present in admixture with up to 50% by weight of polystyrene or with a copolymer containing at least 50% by weight of one or more compounds having the formula:

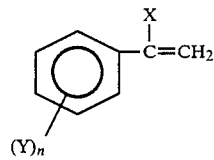 (I)

wherein X is hydrogen or an alkyl radical containing from 1 to 4 carbon atoms, Y represents a halogen atom or an alkyl radical containing from 1 to 4 carbon atoms, and n is zero or a whole number from 1 to 5.

11. A strengthened high impact styrene polymer blend according to claim 10, wherein the high impact styrene polymer is present in admixture with a styrene-acrylonitrile (SAN) copolymer.

12. A strengthened high impact ethylene polymer blend according to claim 1. wherein the high impact styrene polymer consists of:
 (a) 70-90% by weight of a stiff matrix consisting of a copolymer containing 65-80% by weight of styrene and 35-20% by weight of acrylonitrile, and
 (b) 30-10% by weight of an ethylene-propylene-diene rubber.

* * * * *

UNITED STATES PATENT AND TRADEMARK OFFICE
CERTIFICATE OF CORRECTION

PATENT NO. : 4,849,473

DATED : July 18, 1989

INVENTOR(S) : Giuseppe CIGNA, Gian FASULO, Gianfranco BIGLIONE
Italo BORGHI

It is certified that error appears in the above-identified patent and that said Letters Patent is hereby corrected as shown below:

Col. 6, line 13,
    Claim 2, after the phrase "claim 1" insert
--, wherein the ratio by weight:  polyolefin/polyolefin + olefinic rubber is below 0.7--.

Signed and Sealed this

First Day of June, 1993

Attest:

MICHAEL K. KIRK

Attesting Officer

Acting Commissioner of Patents and Trademarks